United States Patent

Marchesani et al.

[11] Patent Number: 5,943,380
[45] Date of Patent: Aug. 24, 1999

[54] ROBUST PHASE ESTIMATOR AND RECOVERER FOR DIGITAL SIGNALS AFFECTED IN PARTICULAR BY PHASE JITTER

[75] Inventors: Rossano Marchesani, Chieti, Italy; Pierre Roux, Argenteuil; Gilles de Villenaut, Paris, both of France

[73] Assignee: Alcatel Telspace, Nanterre Cedex, France

[21] Appl. No.: 08/829,511

[22] Filed: Mar. 28, 1997

[30] Foreign Application Priority Data

Mar. 29, 1996 [FR] France ................................. 96 03993

[51] Int. Cl.⁶ ........................................................ H03D 3/24
[52] U.S. Cl. ........................ 375/376; 375/371; 375/332; 375/344
[58] Field of Search ..................................... 375/375, 376, 375/374, 373, 372, 371, 332, 344; 360/51; 368/560, 508

[56] References Cited

U.S. PATENT DOCUMENTS

| | | |
|---|---|---|
| 4,328,587 | 5/1982 | Mizuno et al. . |
| 4,949,357 | 8/1990 | Sehier ...................................... 375/332 |
| 4,953,186 | 8/1990 | Levy et al. ............................... 375/371 |
| 5,065,107 | 11/1991 | Kumar et al. . |
| 5,090,025 | 2/1992 | Marshall et al. . |
| 5,128,968 | 7/1992 | Yoshida ................................... 375/344 |
| 5,450,447 | 9/1995 | Dutta . |
| 5,579,184 | 11/1996 | Nakanishi et al. ........................ 360/51 |

FOREIGN PATENT DOCUMENTS

3707761A1  9/1988  Germany .

*Primary Examiner*—Stephen Chin
*Assistant Examiner*—Shu Wang Liu
*Attorney, Agent, or Firm*—Sughrue, Mion, Zinn, Macpeak & Seas, PLLC

[57] ABSTRACT

The invention relates to apparatus for synchronizing the phase of a digital signal constituted by two digital components to be corrected defining two samples of a received signal at each symbol time, said apparatus serving to feed a regenerator for regenerating the signal in baseband by sampling and threshold decision-taking, said apparatus including: a first phase-locked loop (31) driven by a first broadband phase-error integrator (37), said first loop (31) being fed with the input signal (30) of the apparatus, and supplying a first phase error estimate (36); and an auxiliary second phase-locked structure (32) driven by re-processing means (38) for re-processing said first phase error estimate (36) established by said first phase-locked loop (31), and outputting a phase synchronized signal fed to an output regenerator (34) for regenerating the signal in baseband; said auxiliary second phase-locked structure (32) being fed with said input signal (30) of the apparatus via delay means (35).

10 Claims, 2 Drawing Sheets

ROBUST PHASE ESTIMATOR AND RECOVERER FOR DIGITAL SIGNALS AFFECTED IN PARTICULAR BY PHASE JITTER

The invention relates to digital communications receivers equipped with phase estimation and recovery means.

In a digital receiver, the signal in baseband is regenerated by a regenerator which operates by sampling and threshold decision-taking. The phase estimation and recovery means are situated upstream from the regenerator, and serve to recover the carrier synchronously and in phase, and, where applicable, to implement adaptive corrections making it possible to improve the quality of the signal on which the regenerator is to work.

The factors that disturb operation of the phase estimation and recovery means include, in particular, wrong estimates of the received data, or Gaussian noise and phase noise.

The poorer the quality of the components used for the local oscillator, the more significant the phase noise. Cheap oscillators typically have poor quality components. Phase noise becomes a crucial factor in the case of microwaves at relatively low bit rates (e.g. a few Mbits per second or even lower), and that are flexible in frequency (i.e. they offer the user (operator or final customer) the option of choosing a frequency from a possible frequency band).

Various means are known for combatting phase noise, essentially consisting either in designing and implementing low-noise oscillators, or in implementing robust demodulators.

In the latter category of solutions, it is known that a technique such as the Costas loop may be used downstream from a carrier phase recovery circuit, and may be implemented either in an analog version or in a digital version by using a digital modulator. Another conventional phase recoverer solution that is more effective consists in obtaining the error after regeneration, and then in integrating its tangential component so as to servo-control a digital modulator.

Furthermore, when the carrier phase has not yet been recovered, it is possible, for example, to implement known differential demodulation techniques. Unfortunately, such techniques are less resistant to noise.

Phase noise is generally constituted by phase jitter, i.e. phase oscillation about a midpoint. As shown in FIG. 1, in the case of quadrature amplitude modulation (QAM) such as four-phase-state (i.e. quaternary) phase shift keying (4-PSK or QPSK), phase jitter results in diagram points (11) of the constellation oscillating on circular arcs (12) at a given frequency and through a given angle.

Regardless of the technique used, the only solution to the problem of compensating phase noise generated in low-performance oscillators is to widen the band of the phase recovery loop so as to track noise at high frequencies. However, a certain number of limits and constraints then arise:

the increase in the bandwidth of the loop, which goes hand in hand with an increase in gain, gives rise to a deterioration in the error estimate supplied to the digital modulator;

furthermore, the electrical delay of the signal processed in the loop marks a limit to the increase in bandwidth of the loop because the delay gives rise to instability at high frequencies, and thus generates additional phase noise. Moreover, the higher the gain, the higher the risk of instability.

Finally, it is also necessary to make sure that the noise of the loop itself does not cause the signal to deteriorate to a greater extent than the improvement expected from processing the signal in the loop.

In other words, with current techniques, the final choice of the characteristics of a digital demodulator is always a compromise between firstly increasing to as wide as possible the noise bandwidth that is to be processed, which assumes that the error signal is integrated to a small extent only, and secondly limiting the risks of instability and of noise generation caused by the demodulation processing, for which it is desirable to integrate the same error signal to a large extent.

An object of the invention is to provide a digital demodulation technique and circuits that make it possible to overcome this dilemma, at least to an extent.

Thus an essential object of the invention is to provide a phase synchronization circuit for a digital demodulator, which circuit makes it possible to work with high gain and over a wide bandwidth, beyond the limits of conventional circuits concerning phase jitter stability and amplification.

An additional object of the invention is to provide a circuit design which is suitable for being implemented for digital signals regardless of whether the carrier phase has already been recovered.

Another object of the invention is to provide such a technique that makes it possible to process phase jitter effectively, and in general to cause the noise level in the signal supplied to the digital regenerator to be lowered effectively.

The invention achieves these objects and others that appear below by providing apparatus for synchronizing the phase of a digital signal constituted by two digital components to be corrected defining two samples of a received signal at each symbol time, said apparatus serving to feed a regenerator for regenerating the signal in baseband by sampling and threshold decision-taking, said apparatus including a first phase-locked loop driven by a first broadband phase-error integrator, said first loop being fed with the input signal of the apparatus, and supplying a first phase error estimate.

The apparatus further includes an auxiliary second phase-locked structure driven by re-processing means for re-processing said first phase error estimate established by said first phase-locked loop, and outputting a phase synchronized signal fed to an output regenerator for regenerating the signal in baseband, said auxiliary second phase-locked structure being fed with said input signal of the apparatus via delay means.

The auxiliary second structure may advantageously be an open or a closed "loop", as described in the description below.

Preferably, said first phase-locked loop includes:
 a first complex modulator to which said digital components to be corrected are applied, and supplying first corrected digital components, said first complex modulator rotating the constellation of the phase states of said received signal as a function of a first piece of information representative of said phase offset;
 a first regenerator receiving said first corrected digital components and supplying a first error signal;
 said first broadband integrator receiving said first error signal and supplying said first piece of information representative of said phase offset to said first complex modulator.

Advantageously, the re-processing means of said auxiliary second structure supply a second complex modulator with a signal corresponding to a second phase error estimate, said digital components being applied via said delay means to said second complex modulator, said second complex modulator supplying second corrected digital components to said output regenerator.

Advantageously, when the apparatus of the invention serves more particularly to synchronize the phase of input signals of the apparatus for which signals carrier phase recovery has already been performed, said first phase error estimate supplied to said re-processing means is constituted by said first piece of information representative of said phase offset output by said first broadband integrator, and said re-processing means are constituted by filtering means.

When the apparatus of the invention serves more particularly to synchronize the phase of input signals of the apparatus for which signals carrier frequency synchronization has not yet been performed, said first phase error estimate supplied to said re-processing means is the advantageously constituted by said first error signal output by said first regenerator, and said re-processing means include filtering means followed by second integration means for integrating the filtered phase error, on the basis of which means is established the signal corresponding to a second phase error estimate as supplied to said second complex modulator of the auxiliary second structure.

In an advantageous embodiment, said filtering means are constituted by a summing circuit [serving to reduce the contribution from the Gaussian noise] establishing a moving average of said first piece of information representative of said phase offset over a predetermined number of samples.

If necessary, said auxiliary second structure includes a correction signal output by the output regenerator and driving the integration means.

According to another characteristic of the invention, said integration means belong to the group comprising integrators and cascades of integrators.

The invention also provides digital demodulators equipped with phase synchronization apparatus as described above, and advantageously, but not exclusively, application of such apparatus and demodulators to digital signals modulated in QAM of arbitrary order.

Other characteristics and advantages of the invention appear on reading the following description of particular embodiments of the invention given with reference to the accompanying drawings, in which.

Figure 3:
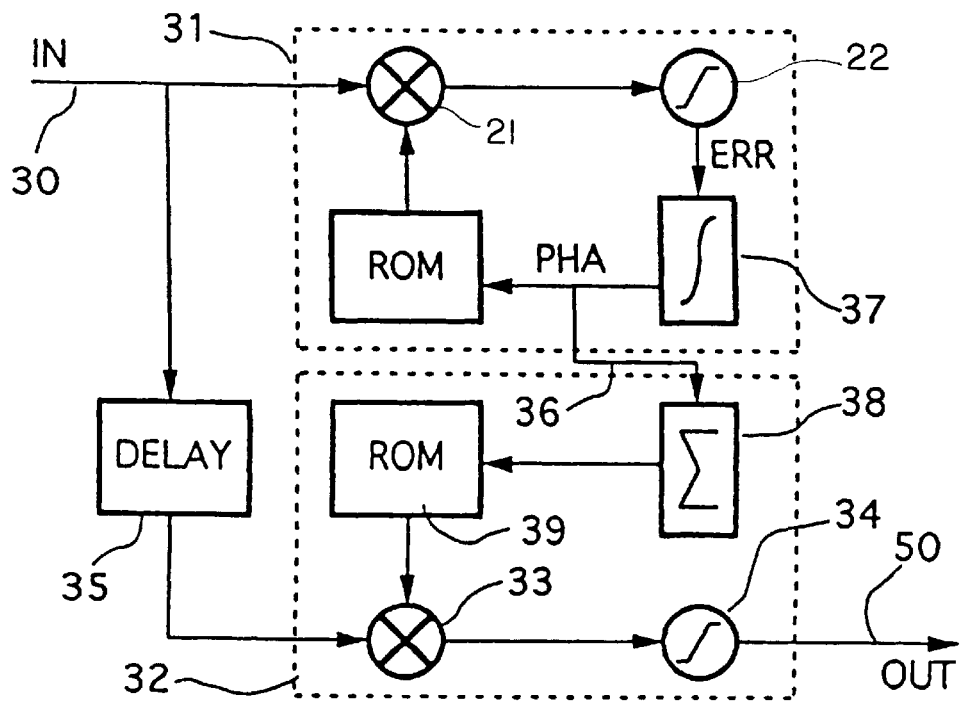
Figure 4:
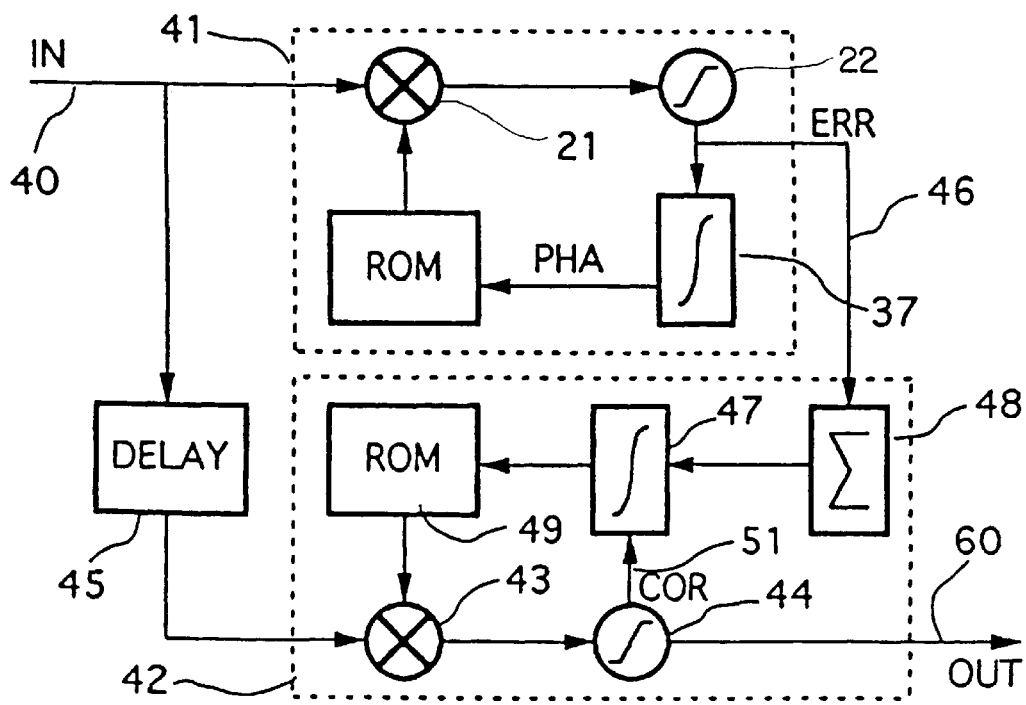

FIG. 3 shows a first embodiment of apparatus of the invention for synchronizing the phase of a digital signal, corresponding to processing a signal on which carrier phase recovery has already been performed; and FIG. 4 shows a second embodiment of apparatus of the invention for synchronizing the phase of a digital signal, corresponding to processing a signal on which carrier phase recovery has not yet been performed.

Conventionally, in known phase synchronization circuits, the input signal 20 is supplied to a complex modulator (rotator) which corrects the phase, and optionally the amplitude, of the received signal. At the output of the rotator 21, the corrected signal is applied to a regenerator 22 which regenerates the signal in baseband by sampling and threshold decision-taking.

The complex modulator 21 is driven by a signal 24 representative of the phase error. The signal 24 is supplied by a phase error integrator 25 fed with an error signal 26 supplied by the regenerator 22. The phase error integrator 25 causes the signal 24 to be transmitted via a ROM 28 (or any other equivalent circuit) accessed via phase offset information 27 output by the integrator 25.

That conventional loop thus makes it possible to extract the tangential component 26 of the phase error, and to integrate it in the integrator 25 so as to servocontrol the digital modulator 21.

That type of circuit suffers from the drawbacks recalled in the preamble.

As shown in FIG. 3, a first embodiment of the invention is constituted by two chained loops, namely:

a "fast" first loop 31 which integrates the error signal over a large bandwidth, i.e. performing just enough integration to guarantee stability; and an "auxiliary" second loop 32 which receives a first phase error estimate supplied by the fast first loop 31, and re-processes said phase error estimate (in this example by filtering to reduce the contribution from the Gaussian noise) before it drives an auxiliary complex modulator 33. The output regenerator 34 which reestablishes and decides on the signal in baseband is fed by the auxiliary digital modulator 33 which processes the input signal of the apparatus directly via delay means 35.

Thus, the output regenerator 34 works on a signal in which phase has been compensated at the speed of the conventional loop, but after the Gaussian noise has been compensated in the auxiliary loop 32.

Figure 1:
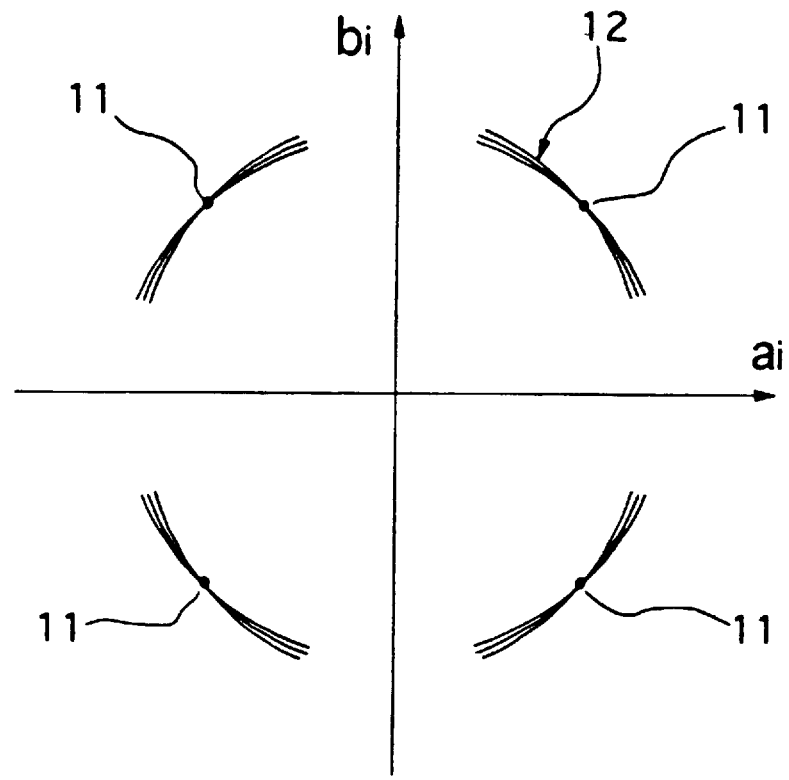
FIG. 1 shows a constellation of amplitude and phase states representative of four-phase-state QAM-type modulation, diagrammatically showing the phase jitter phenomenon.
Figure 2:
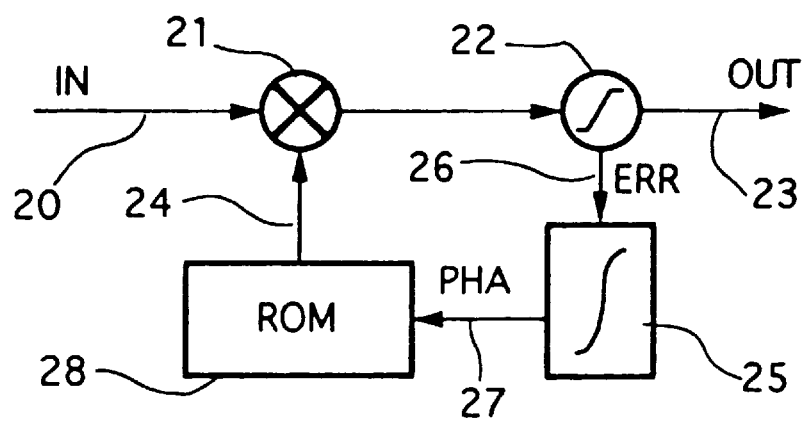
FIG. 2 shows a conventional phase synchronization circuit characteristic of the state of the art.

The fast first loop 31 is constituted by the same components as those of a conventional loop, as described in FIG. 2. But clearly, the operating parameters are chosen to have a phase-locked loop that is as fast as possible.

As a result, the fast loop 31 works on a signal having increased noise and a higher error rate, but it is used only to obtain a phase error estimate (re-processed in the auxiliary loop 32), the data regenerated in the fast first loop 31 not being used.

The first phase error estimate 36 supplied to the auxiliary loop 32 is constituted by the integrated phase error produced by the integrator (25, 37) in the fast loop 31.

The integrated phase error 36 is applied to processing means 38 of the auxiliary circuit 32. As already mentioned, these processing means 38 are constituted by filtering means, typically a summing circuit establishing a moving average of the phase error signal 36 over a predetermined number of samples.

Other filtering means may be used, provided that they make it possible to obtain the same result, i.e. to reduce the contribution from the Gaussian noise.

The signal obtained at the output of the summing circuit 38 is used to drive the complex modulator 33 via the ROM 39.

It should be noted that the ROM circuit 39 used makes it possible to transcribe the integrated and filtered phase error into a piece of information suitable for driving the complex modulator 33 appropriately. Any other equivalent means may be used, e.g. a circuit operating using the Cordic algorithm or the like.

This type of circuit thus makes it possible to correct effectively both the phase error and the Gaussian component affecting the received signal.

It has a general application in combatting the instability of conventional loops (FIG. 2) under certain operating conditions.

In a particular case, in which a large phase error is to be corrected in the signal, the fast first loop 31 makes it possible to extract effectively the tangential component of the phase value over a wide equivalent noise band, the Gaussian component affecting the signal then being compensated in the auxiliary loop.

In the second embodiment of the invention shown diagrammatically in FIG. 4, the circuit shown corresponds to an application in which the input signal 40 has not been frequency synchronized. In other words, the constellation of the phase states is affected by rotation in addition to phase jitter.

The design of the apparatus of the invention in the form of two chained loops makes it possible to handle this case. In other words, the invention provides apparatus that is robust enough to be fed with an input signal in which the carrier has not been (fully) recovered.

In this embodiment, the first loop 41 acts very similarly to the first loop 31 of the embodiment shown in FIG. 3. The various components of conventional loops are also to be found in it, in particular the phase error integrator 37.

However, in this embodiment, the phase error estimate supplied to the auxiliary circuit 42 is constituted by the error signal output by the regenerator 22 in the first loop 41.

The error signal 46 is supplied to first filtering means 48 of a similar type to the filtering means 38 in the embodiment shown in FIG. 3.

The filtered signal is then conveyed to integration means 47. These integration means 47 act similarly to those of the first loop 41. However, they integrate a signal that is pre-filtered (by the summing circuit 48), which enables the phase discontinuities of the signal to be managed "cleanly".

The remainder of the components of the auxiliary loop (ROM 49, complex multiplier 43, output regenerator 44) are of the same type as the corresponding elements in the auxiliary circuit 32 of the embodiment shown in FIG. 3.

In an optional embodiment, the auxiliary loop 42 may be "re-closed" in order to guarantee its stability. In which case, an error signal 51 output by the output regenerator 44 can drive the integrator 47. The time constant of the signal 51 is very considerably greater than the time constant of the integrator 47 so as to guarantee its stability.

Furthermore, it should be noted that the integration means 37, 47 may be constituted by a single integrator, or by a cascade of integrators if necessary.

Ultimately, by means of the layout shown in FIG. 4, a circuit is obtained that makes it possible to compensate for the frequency offsets of the input signal 40. The fast first loop which has high gain makes it possible to recover any offset whatsoever, the error signal then being re-processed in the auxiliary loop to regenerate it in baseband.

Regardless of whether the embodiment in FIG. 3 or the embodiment in FIG. 4 is used, it is thus possible to obtain both a fast loop band enabling the error to be tracked at high frequencies, and also a noise level which can be obtained only with a slower loop (in the auxiliary loop). The output regenerator 34, 44 can thus work under optimum conditions.

This type of layout makes it possible to use local oscillators that are cheaper, i.e. that have significantly poorer phase noise characteristics, without causing performances to deteriorate.

We claim:

1. Apparatus for synchronizing the phase of a digital signal constituted by two digital components to be corrected at each symbol time of a received signal, said components comprising an in-phase component and a quadrature component, said apparatus serving to feed a regenerator for regenerating the signal in baseband by sampling and threshold decision-taking; said apparatus comprising:

a first phase-locked loop driven by a first broadband phase-error integrator, said first loop being fed with the input signal of the apparatus, and supplying a first phase error estimate;

an auxiliary second phase-locked structure driven by reprocessing means for reprocessing said first phase error estimate established by said first phase-locked loop, and outputting a phase synchronized signal fed to an output regenerator for regenerating the signal in baseband; and said auxiliary second phase-locked structure is fed with said input signal of the apparatus via delay means.

2. Apparatus according to claim 1, wherein said first phase-locked loop includes:

a first complex modulator to which said digital components to be corrected are applied, and supplying first corrected digital components, said first complex modulator rotating the constellation of the phase states of said received signal as a function of a first piece of information representative of said phase offset;

a first regenerator receiving said first corrected digital components and supplying a first error signal;

said first broadband integrator receiving said first error signal and supplying said first piece of information representative of said phase offset to said first complex modulator.

3. Apparatus according to claim 1, wherein the re-processing means of said auxiliary second structure supply a second complex modulator with a signal corresponding to a second phase error estimate, said digital components being applied via said delay means to said second complex modulator, said second complex modulator supplying second corrected digital components to said output regenerator.

4. Apparatus according to claim 3, wherein said first phase error estimate supplied to said re-processing means is constituted by said first piece of information representative of said phase offset output by said first broadband integrator; and said re-processing means are constituted by filtering means.

5. Apparatus according to claim 3, wherein said first phase error estimate supplied to said re-processing means is constituted by said first error signal output by said first regenerator;

and in that said re-processing means include filtering means followed by second integration means for integrating the filtered phase error, on the basis of which means is established the signal corresponding to a second phase error estimate as supplied to said second complex modulator of the auxiliary second structure.

6. Apparatus according to claim 4, wherein said filtering means are constituted by a summing circuit establishing a moving average of said first piece of information representative of said phase offset over a predetermined number of samples.

7. Apparatus according to claim 4, wherein said auxiliary second structure includes a correction signal output by the output regenerator and driving the integration means.

8. Apparatus according to claim 1, wherein said integration means belong to the group comprising integrators and cascades of integrators.

9. A digital demodulator equipped with phase synchronization apparatus according to claim 1.

10. The use of the apparatus and of the demodulator according to claim 9 with digital signals modulated in QAM of arbitrary order.

* * * * *